United States Patent
Hwang et al.

(10) Patent No.: US 11,715,573 B2
(45) Date of Patent: Aug. 1, 2023

(54) DECOMMISSIONING METHOD OF BIODEGRADABLE CONCRETE OF PWR TYPE NUCLEAR POWER PLANT

(71) Applicant: KOREA HYDRO & NUCLEAR POWER CO., LTD., Gyeongju-si (KR)

(72) Inventors: Seok-Ju Hwang, Daejeon (KR); Sung-Hoon Hong, Daegu (KR); Mi-Hyun Lee, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 0 days.

(21) Appl. No.: 17/047,826

(22) PCT Filed: Apr. 17, 2019

(86) PCT No.: PCT/KR2019/004659
§ 371 (c)(1),
(2) Date: Oct. 15, 2020

(87) PCT Pub. No.: WO2019/203576
PCT Pub. Date: Oct. 24, 2019

(65) Prior Publication Data
US 2021/0158981 A1    May 27, 2021

(30) Foreign Application Priority Data
Apr. 17, 2018  (KR) .......................... 10-2018-0044579

(51) Int. Cl.
*G21D 1/00*     (2006.01)
*G21C 17/116*   (2006.01)

(52) U.S. Cl.
CPC ........... *G21D 1/003* (2013.01); *G21C 17/116* (2013.01)

(58) Field of Classification Search
CPC ...... G21D 1/003; G21C 17/116; G21C 11/02; G21F 9/30
See application file for complete search history.

(56) References Cited

U.S. PATENT DOCUMENTS

| | | |
|---|---|---|
| 2015/0060686 A1 | 3/2015 | DeVolpi |
| 2018/0190396 A1* | 7/2018 | Brun ...................... G01R 31/54 |

FOREIGN PATENT DOCUMENTS

| | | | |
|---|---|---|---|
| FR | 2707418 A1 * | 1/1995 | .......... G21C 17/108 |
| GB | 2245214 | 1/1992 | |
| JP | 59-023298 | 2/1984 | |
| JP | 61-017696 | 2/1986 | |

(Continued)

OTHER PUBLICATIONS

EPO, Search Report of EP 19787622.0 dated Dec. 8, 2021.

*Primary Examiner* — Jack W Keith
*Assistant Examiner* — Joshua C Devorkin
(74) *Attorney, Agent, or Firm* — Lex IP Meister, PLLC

(57) ABSTRACT

A decommissioning method of biological shielding concrete of a nuclear power plant according to an exemplary embodiment includes: decommissioning a neutron detector positioning device installed to biological shielding concrete surrounding a nuclear reactor to form a plurality of penetrated parts in the biological shielding concrete; inserting a part of a cutting device into the plurality of penetrated parts; and decomposing the biological shielding concrete into a plurality of sub-concrete parts by using the cutting device.

5 Claims, 7 Drawing Sheets

(56) References Cited

FOREIGN PATENT DOCUMENTS

| | | |
|---|---|---|
| JP | 04-158297 | 6/1992 |
| JP | 05-196797 | 8/1993 |
| JP | 1993-196797 | 8/1993 |
| JP | 08-194097 | 7/1996 |
| JP | 2005-83923 | 3/2005 |
| JP | 2005083923 A * | 3/2005 |
| JP | 4158657 | 10/2008 |

* cited by examiner

DECOMMISSIONING METHOD OF BIODEGRADABLE CONCRETE OF PWR TYPE NUCLEAR POWER PLANT

TECHNICAL FIELD

The present disclosure relates to a decommissioning method of biological shielding concrete of a nuclear power plant. More particularly, the present invention relates to a decommissioning method of biological shielding concrete of a PWR type of nuclear power plant.

BACKGROUND ART

As a fossil energy is depleted worldwide, nuclear power generation is being used as a major energy source. In such nuclear power generation, a generally-used pressurized water reactor (PWR) nuclear power plant consists of a primary system circulating in a nuclear reactor, a secondary system circulating in a steam generator, and a tertiary system circulating in a condenser. Specifically, in the primary system, a pressure is applied to a coolant contained in a reactor to maintain 150 atm and 300° C., and in the secondary system, the coolant boils water on the side of the steam generator while passing through the steam generator to generate steam to turn a turbine. In the tertiary system, the steam generated for turning the turbine passes through a condenser, becomes water again, and is sent to the steam generator.

The nuclear reactor of such a PWR type of nuclear power plant includes an external pressure vessel, and a nuclear reactor vessel composed of a core barrel that is formed with a smaller diameter than that of the pressure vessel and installed at the center of the pressure vessel. Inside the core barrel, the core into which a nuclear fuel rod is loaded is positioned, and a precipitation unit, which is a space of a ring shape due to the difference in diameter, is formed between the core barrel and the pressure vessel. In addition, a plurality of low temperature tubes that are connected to the pressure vessel and become circulation passages of cooling water, and a high temperature tube (hot leg) connected to the core barrel so that the cooling water heated while inflowing through the low temperature tubes and passing through the precipitation unit and the core flows toward the steam generator, are included.

In this PWR type of nuclear power plant, biological shielding concrete is installed as a reinforced concrete structure to protect against radiation exposure of workers by supporting the nuclear reactor and shielding neutrons.

The biological shielding concrete forms a large cylindrical reinforced concrete structure by stacking a plurality of layers, and since the biological shielding concrete is most severely contaminated with a radioactive material, when decommissioning a pressurized light water reactor (PWR) type of nuclear power plant that has expired and is permanently stopped, workers are likely to be exposed. When a hole is formed in the biological shielding concrete to insert a decommissioning device into the biological shielding concrete, radioactive dust is generated, so there is a risk of radioactive exposure and movement of the radioactive dust. In addition, since the process of forming the holes in the biological shielding concrete is added, a decommissioning process time increases.

DISCLOSURE

Technical Problem

The present exemplary embodiment relates to a decommissioning method of biological shielding concrete of a nuclear power plant that may shorten the decommissioning process time and minimize worker exposure.

Technical Solution

A decommissioning method of biological shielding concrete of a nuclear power plant according to an exemplary embodiment may include: decommissioning a neutron detector positioning device installed to biological shielding concrete surrounding a nuclear reactor to form a plurality of penetrated parts in the biological shielding concrete; inserting a part of a cutting device into the plurality of penetrated parts; and decomposing the biological shielding concrete into a plurality of sub-concrete parts by using the cutting device.

Decommissioning the nuclear reactor by inserting a nuclear reactor decommissioning device into the inside of the biological shielding concrete may be further included.

The biological shielding concrete may have a cylindrical inner wall and a hexahedral outer wall, and the penetrated part may extend from the cylindrical inner wall to the hexahedral outer wall.

The penetrated part may have a diameter that is smaller from the cylindrical inner wall toward the hexahedral outer wall.

The neutron detector positioning device may include: a neutron sensor adjacent to the nuclear reactor; an external adjuster moving the neutron sensor; and a connection member connecting the neutron sensor and the external adjuster to each other and penetrating the biological shielding concrete, and the decommissioning of the neutron detector positioning device installed to the biological shielding concrete may include: adhering the neutron sensor to the biological shielding concrete inner wall by using the external adjuster; cutting the external adjuster and the connection member; and separating the connection member from the biological shielding concrete to form the penetrated part in the biological shielding concrete.

The neutron detector positioning device may further include a transferring unit installed under the neutron sensor, and the neutron sensor may be moved to the biological shielding concrete inner wall by using the transferring unit.

The cutting device may include a wire saw.

Advantageous Effects

According to an exemplary embodiment, as the cutting and decommissioning processes are performed without additional coring work on the biological shielding concrete by inserting the decommissioning device into the penetrated part of the neutron detector positioning device installed inside the biological shielding concrete, the decommissioning process time may be shortened.

In addition, since there is no separate coring work, generation of the radioactive dust may be minimized, thus minimizing worker exposure.

MODE FOR INVENTION

Figure 1:
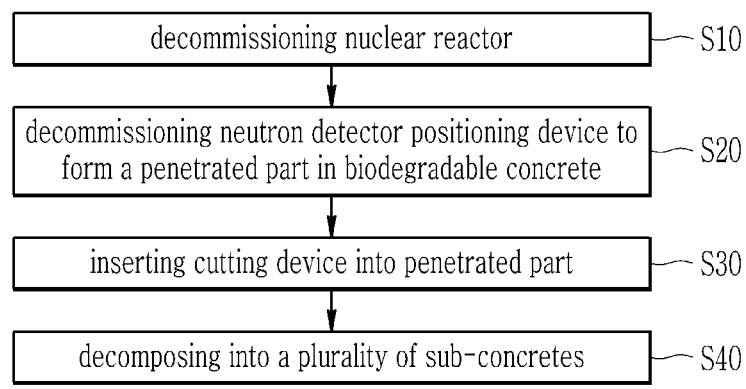
FIG. 1 is a flowchart of a decommissioning method of biological shielding concrete of a nuclear power plant according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain the present invention, portions that are not directly related to the present invention are omitted, and the same reference numerals are attached to the same or similar constituent elements through the entire specification.

In addition, the size and thickness of each configuration shown in the drawings are arbitrarily shown for better understanding and ease of description, but the present invention is not limited thereto.

In the drawings, the thickness of layers, films, panels, regions, etc., are exaggerated for clarity. In the drawings, for better understanding and ease of description, the thicknesses of some layers and areas are exaggerated. It will be understood that when an element such as a layer, film, region, or substrate is referred to as being "on" another element, it can be directly on the other element or intervening elements may also be present.

In addition, unless explicitly described to the contrary, the word "comprise", and variations such as "comprises" or "comprising", will be understood to imply the inclusion of stated elements but not the exclusion of any other elements. Further, in the specification, the word "on" means positioning on or below the object portion, but does not essentially mean positioning on the upper side of the object portion based on a gravity direction.

Figure 2:
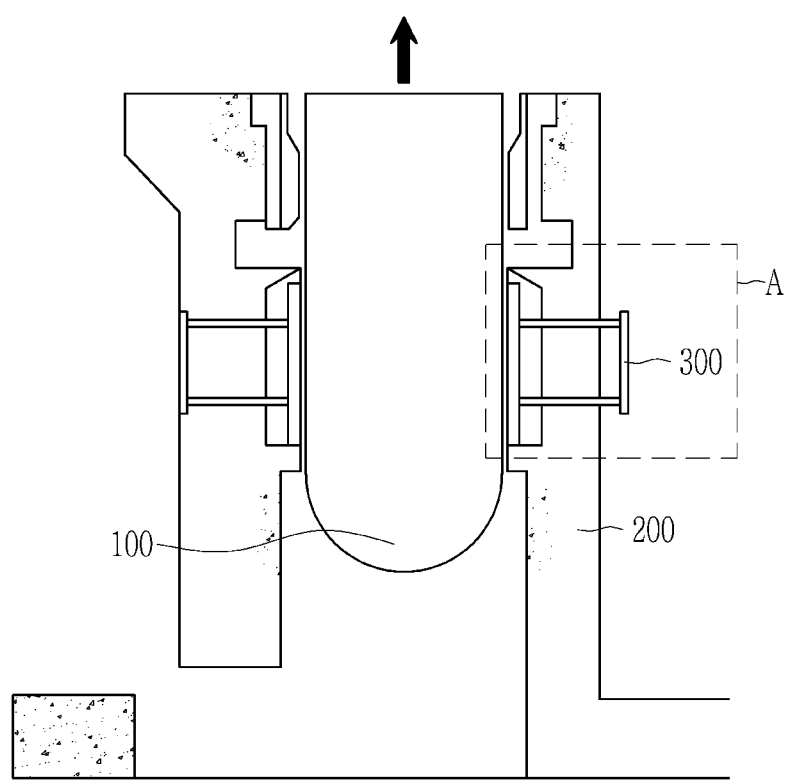
FIG. 2 is a view showing a step of decommissioning a nuclear reactor as a step of a decommissioning method of biological shielding concrete of a nuclear power plant according to an exemplary embodiment.

FIG. 1 is a flowchart of a decommissioning method of biological shielding concrete of a nuclear power plant according to an exemplary embodiment, and FIG. 2 is a view showing a step of decommissioning a nuclear reactor as a step of a decommissioning method of biological shielding concrete of a nuclear power plant according to an exemplary embodiment.

As shown in FIG. 1 and FIG. 2, a decommissioning method of biological shielding concrete of a nuclear power plant according to an exemplary embodiment includes first inserting a nuclear reactor decommissioning device inside biological shielding concrete 200 to decommission a nuclear reactor 100 (S10).

Next, a neutron detector positioning device 300 installed in the biological shielding concrete 200 surrounding the nuclear reactor 100 is decommissioned to form a plurality of penetrated parts 210 in the biological shielding concrete 200 (S20).

Hereinafter, a detailed structure of the neutron detector positioning device 300 is described in detail.

Figure 3:
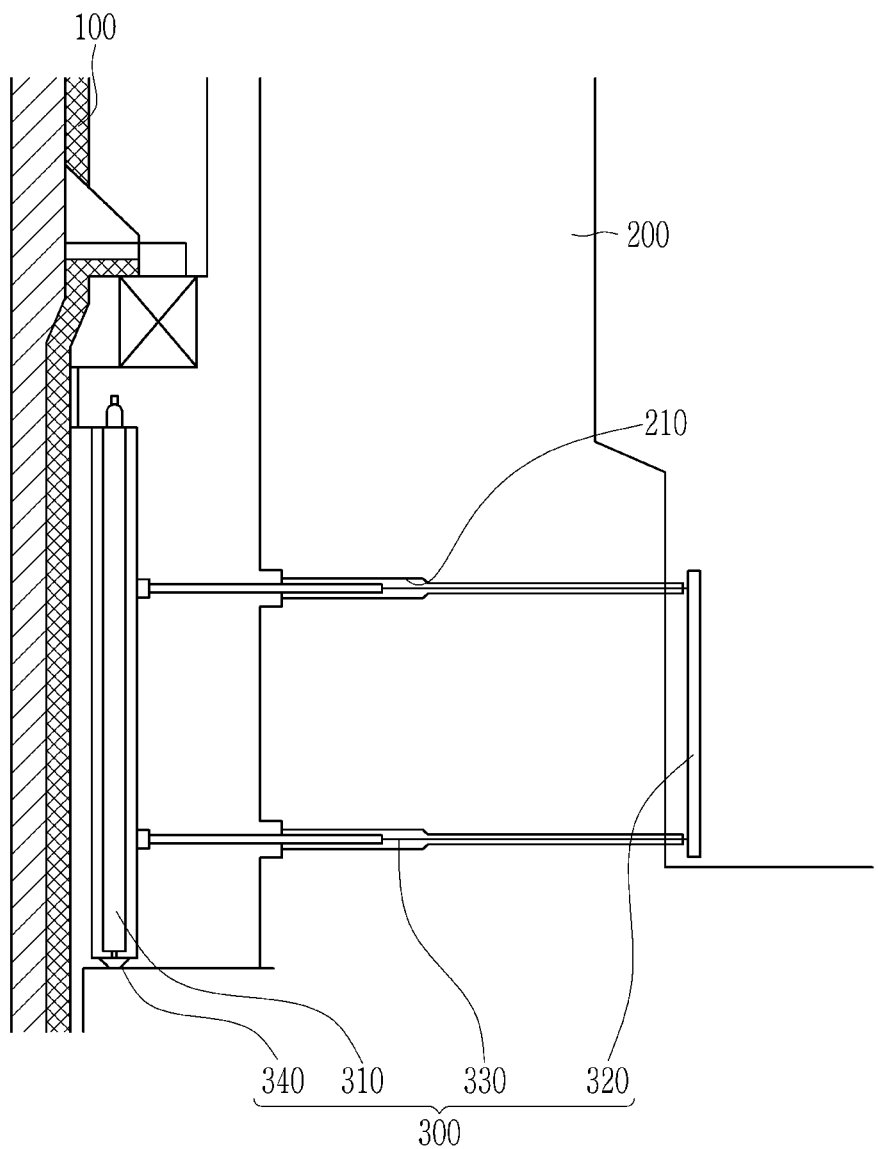
FIG. 3 is an enlarged view of a part A of FIG. 2.
Figure 4:
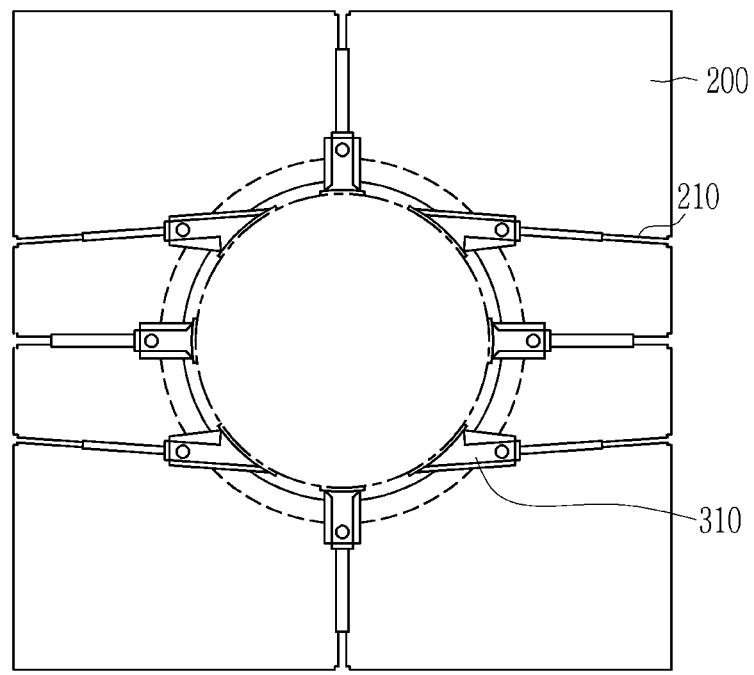
FIG. 4 is a top plan view of FIG. 2.

FIG. 3 is an enlarged view of a part A of FIG. 2, and FIG. 4 is a top plan view of FIG. 2.

As shown in FIG. 2 to FIG. 4, a plurality of neutron detector positioning devices 300 may be installed to the biological shielding concrete 200. Specifically, a plurality of neutron detector positioning devices 300 may be installed in four directions of the biological shielding concrete 200 of a hexahedral shape.

The neutron detector positioning device 300 includes a neutron sensor 310 adjacent to a nuclear reactor 100, an external adjuster 320 moving the neutron sensor 310, a connection member 330 connecting the neutron sensor 310 and the external adjuster 320 to each other and penetrating the biological shielding concrete 200, and a transferring unit 340 installed under the neutron sensor 310.

The neutron sensor 310 is for measuring the neutrons of the nuclear reactor 100, and may be installed in a belt-line position of the nuclear reactor 100.

The external adjuster 320 may be directly adjusted by workers from the outside of the biological shielding concrete 200 or may use unmanned power. The connection member 330 may be formed linearly and may be smaller than the diameter of the penetrated part 210 formed in the biological shielding concrete 200.

Figure 5:
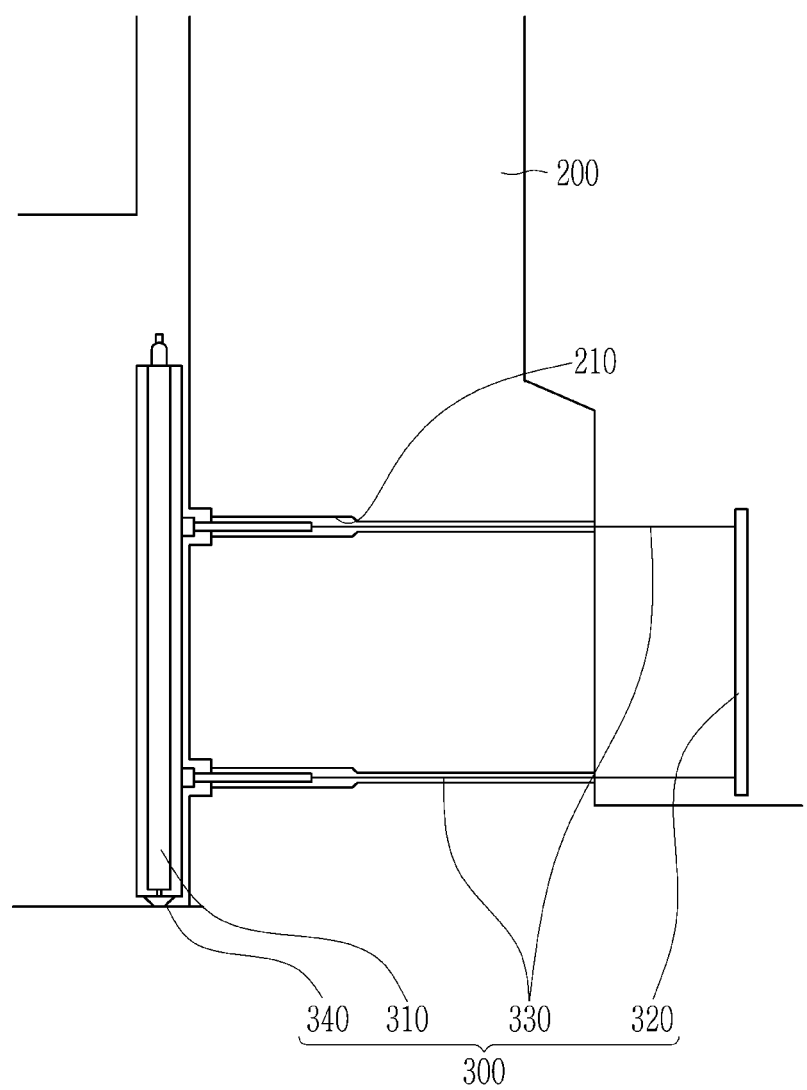
FIG. 5 is a view showing a step of disassembling a neutron sensing position control device from biological shielding concrete to form a penetrated part in biological shielding concrete as the next step after that of FIG. 2.

FIG. 5 is a view showing a step of disassembling a neutron sensing position control device from biological shielding concrete to form a penetrated part in biological shielding concrete as the next step after that of FIG. 2.

The biological shielding concrete 200 may have a cylindrical inner wall and a hexahedral outer wall.

The step of decommissioning the neutron detector positioning device 300 installed on the biological shielding concrete 200 is specifically as follows.

As shown in FIG. 5, the neutron sensor 310 is adhered to the biological shielding concrete 200 inner wall by using the external adjuster 320. At this time, the neutron sensor 310 may be moved to the biological shielding concrete 200 inner wall by using the transferring unit 340.

Also, a connection part between the external adjuster 320 and the connection member 330 is cut. The cut connection part may be disposed outside of the biological shielding concrete 200. Various cutting tools may be used as the cutting device.

Then, the connection member 330 is separated from the biological shielding concrete 200 to form a penetrated part 210 in the biological shielding concrete 200. At this time, the neutron sensor 310 connected to the connection member 330 may be decommissioned from the biological shielding concrete 200 by moving from the inside of the biological shielding concrete 200 to the top.

Thus, the penetrated part 210 may extend from the cylindrical inner wall to the hexahedral outer wall. The penetrated part 210 may have a smaller diameter from the cylindrical inner wall to the hexahedral outer wall. In the present exemplary embodiment, the penetrated part is formed in a stepped shape, but it is not limited thereto, and may be formed in various shapes.

Since the inner wall of the biological shielding concrete 200 is severely contaminated with a radioactive material, a process of decontaminating the inner wall of the biological shielding concrete 200 may be added. A decontamination device (not shown) to proceed with the decontamination process may be put into the interior of the biological shielding concrete 200. The decontamination device may include an inner wall hammer or a scabbler. The inner wall hammer hits the inner wall of the biological shielding concrete 200 to removes radioactive waste from the inner wall of the biological shielding concrete 200. Further, the scabbler scrapes the inner wall of the biological shielding concrete 200 to remove the radioactive waste from the inner wall of the biological shielding concrete 200. In the present exemplary embodiment, the inner wall hammer or the scabbler has been described as an example of the decontamination device, but it is not limited thereto, and various devices are possible as long as it is a device for removing the radioactive waste from the inner wall of the biological shielding concrete 200.

After the decontamination process is completed, the biological shielding concrete 200 may be decomposed into a plurality of sub-concrete parts.

Figure 6:
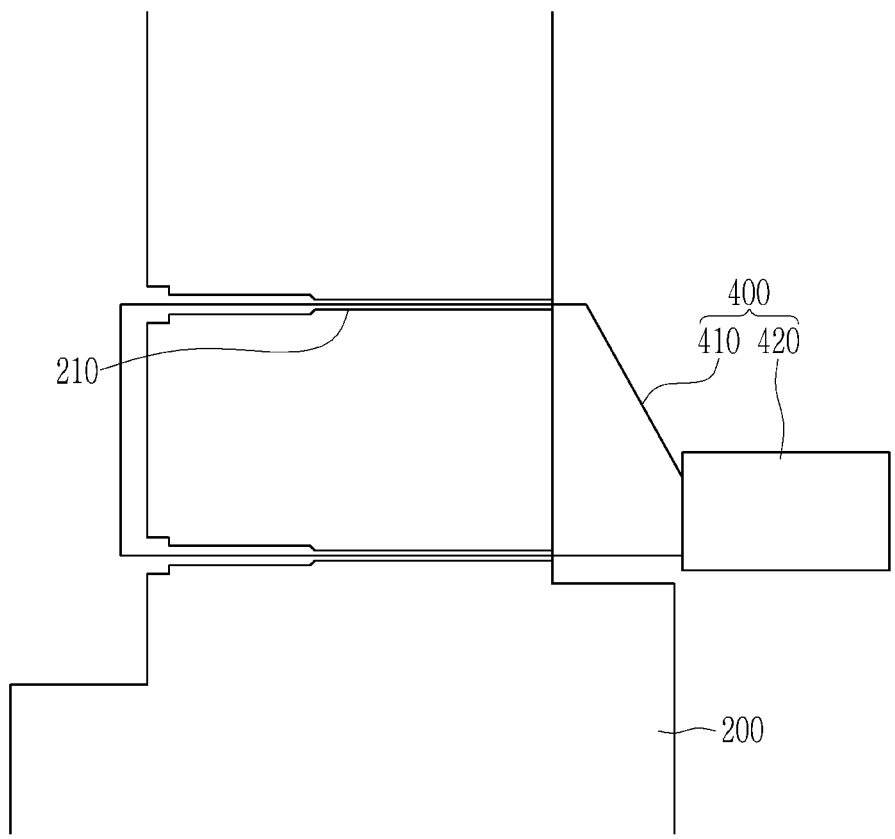
FIG. 6 is a view showing a step of cutting biological shielding concrete by inserting a cutting device into the penetrated part of biological shielding concrete as the next step after that of FIG. 5.
Figure 7:
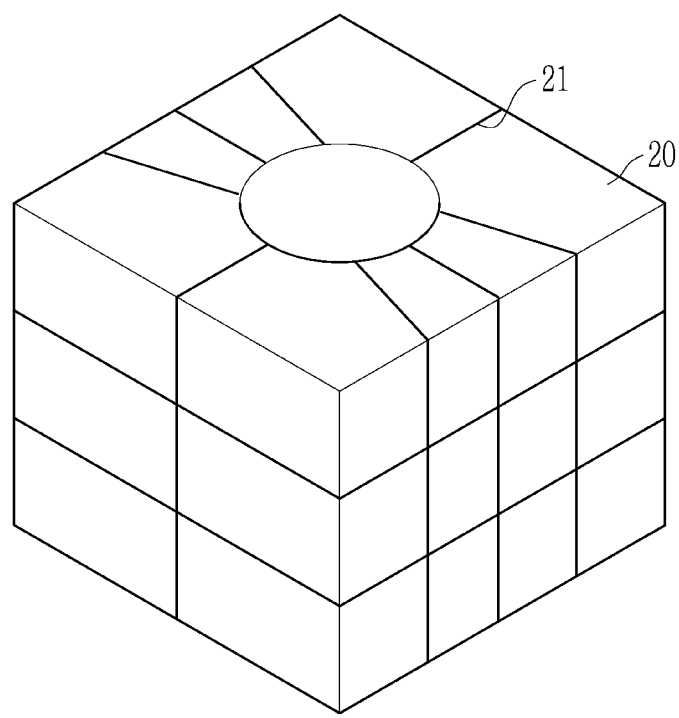
FIG. 7 is a view showing decomposed biological shielding concrete according to the decommissioning method of biological shielding concrete of a nuclear power plant according to an exemplary embodiment.

FIG. 6 is a view showing a step of cutting biological shielding concrete by inserting a cutting device into the penetrated part of biological shielding concrete as the next step after that of FIG. 5, and FIG. 7 is a view showing biological shielding concrete decomposed according to the decommissioning method of biological shielding concrete of a nuclear power plant according to an exemplary embodiment.

As shown in FIG. 6, a part of a cutting device 400 is inserted into a plurality of penetrated parts 210 (S30). The cutting device 400 may include a cutting unit 410 that is inserted into the penetrated part 210 and a cutting adjustment unit 420 that controls the operation of the cutting unit 410 and is connected to the cutting unit 410. Since the diameter of the penetrated part 210 decreases from the cylindrical inner wall to the hexahedral outer wall, the cutting unit 410 may be inserted more easily into the penetrated part 210.

The cutting device 400 may include a wire saw. In the present exemplary embodiment, the wire saw is described as an example of the cutting device, but it is not limited thereto, and various devices that may be inserted into the penetrated part 210 are applicable.

Next, as shown in FIG. 7, the biological shielding concrete 200 is decomposed into a plurality of sub-concrete parts 20 using the cutting device 400 (S40). The biological shielding concrete 200 may be decomposed into a plurality of sub-concrete parts 20 by a cutting line 21.

In this way, as the cutting and decommissioning processes are performed without additional coring work on the biological shielding concrete 200 by decommissioning the neutron detector positioning device and inserting the decommissioning device into the penetrated part 210 formed inside the biological shielding concrete 200, the decommissioning process time may be shortened.

In addition, since there is no separate coring work, the generation of the radioactive dust may be minimized, thus minimizing worker exposure.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A decommissioning method of biological shielding concrete of a nuclear power plant, comprising:
    decommissioning a neutron detector positioning device installed in the biological shielding concrete surrounding a nuclear reactor thereby exposing a plurality of penetrated parts in the biological shielding concrete, wherein the plurality of penetrated parts are cavities formed in the biological shielding concrete for accommodating the neutron detector positioning device and therefore pre-exist before decommissioning the neutron detector positioning device, the plurality of penetrated parts being defined by an external surface of the biological shielding concrete;
    inserting a part of a cutting device into the plurality of penetrated parts, wherein, during the inserting, the cutting device directly contacts the external surface of the biological shielding concrete in the plurality of penetrated parts; and
    breaking up the biological shielding concrete into a plurality of sub-concrete parts by using the cutting devices, wherein the biological shielding concrete has an inner wall and an outer wall, the penetrated parts extend from the inner wall to the outer wall, the inner wall is curved and the outer wall is flat.

2. The decommissioning method of claim 1, wherein the penetrated parts have a diameter that is smaller at the inner wall than at the outer wall.

3. The decommissioning method of claim 1, wherein the neutron detector positioning device includes:
    a neutron sensor adjacent to the nuclear reactor;
    an external adjuster disposed outside of the biological shielding concrete and configured to move the neutron sensor; and
    a connection member connecting the neutron sensor and the external adjuster to each other and penetrating the biological shielding concrete, and
    the decommissioning of the neutron detector positioning device installed to the biological shielding concrete includes:
    moving the neutron sensor toward the biological shielding concrete inner wall by pulling the external adjuster;
    cutting the external adjuster and the connection member; and
    separating the connection member from the biological shielding concrete to expose the penetrated parts in the biological shielding concrete.

4. The decommissioning method of claim 3, wherein the neutron detector positioning device further includes a transferring unit installed under the neutron sensor, and the neutron sensor is moved to the biological shielding concrete inner wall riding on the transferring unit.

5. The decommissioning method of claim 1, wherein the cutting device includes a wire saw.

\* \* \* \* \*